US012620103B2

(12) United States Patent
Kimura et al.

(10) Patent No.: US 12,620,103 B2
(45) Date of Patent: May 5, 2026

(54) CONTROL APPARATUS, CONTROL METHOD AND STORAGE MEDIUM

(71) Applicant: CANON KABUSHIKI KAISHA, Tokyo (JP)

(72) Inventors: Hiroaki Kimura, Kanagawa (JP); Kota Uchiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 355 days.

(21) Appl. No.: 18/424,456

(22) Filed: Jan. 26, 2024

(65) Prior Publication Data

US 2024/0257358 A1 Aug. 1, 2024

(30) Foreign Application Priority Data

Jan. 30, 2023 (JP) ................................. 2023-012277

(51) Int. Cl.
| | |
|---|---|
| *G06K 9/00* | (2022.01) |
| *G06T 7/00* | (2017.01) |
| *G06T 7/20* | (2017.01) |
| *H04N 23/69* | (2023.01) |
| *H04N 23/695* | (2023.01) |

(52) U.S. Cl.
CPC .............. *G06T 7/20* (2013.01); *H04N 23/69* (2023.01); *H04N 23/695* (2023.01)

(58) Field of Classification Search
USPC ....... 382/100, 103, 106–107, 154, 156, 162, 382/167, 173, 181, 276, 305, 312; 348/169
See application file for complete search history.

(56) References Cited

U.S. PATENT DOCUMENTS

| | | | | |
|---|---|---|---|---|
| 2012/0268608 | A1* | 10/2012 | Watanabe ............ | H04N 23/695 |
| | | | | 348/169 |
| 2020/0186721 | A1* | 6/2020 | Ogawa ................... | G06V 10/24 |
| 2021/0092281 | A1* | 3/2021 | Tanaka ................... | H04N 23/61 |
| 2021/0092287 | A1* | 3/2021 | Kadoi ................... | H04N 23/64 |
| 2021/0099637 | A1* | 4/2021 | Kagaya ................. | H04N 23/61 |
| 2021/0099652 | A1* | 4/2021 | Kagaya ................. | H04N 23/69 |
| 2021/0266450 | A1* | 8/2021 | Ito .......................... | H04N 23/69 |

FOREIGN PATENT DOCUMENTS

| | | |
|---|---|---|
| JP | H07226873 A | 8/1995 |
| JP | 2002171438 A | 6/2002 |
| JP | 2010093362 A | 4/2010 |

* cited by examiner

*Primary Examiner* — Seyed H Azarian
(74) *Attorney, Agent, or Firm* — Canon U.S.A., Inc. IP Division

(57) ABSTRACT

A tracking apparatus includes a memory storing instructions, and a processor that implements the instructions as a first controller that executes image capturing direction control by pan drive or tilt drive to capture an object within a predetermined position, and a second controller, different from the first controller, that executes angle of view control by shifting an angle of view of an image capturing apparatus to capture the object within the predetermined position, wherein tracking the object is executed by at least any one of the first controller and the second controller, wherein the first controller determines whether to execute the image capturing direction control by the first controller, based on a shift amount of the angle of view determined based on a moving amount of the object.

13 Claims, 10 Drawing Sheets

CONTROL APPARATUS, CONTROL METHOD AND STORAGE MEDIUM

BACKGROUND OF THE DISCLOSURE

Field of the Disclosure

The present disclosure relates to a control apparatus, a control method, and a storage medium.

Description of the Related Art

In recent years, for the purpose of saving human resources at an image production site, image capturing of an object by using an auto-tracking function of a camera supporting a pan-tilt-zoom function (hereinafter, called "pan-tilt-zoom (PTZ) camera") has been frequently executed.

In the process of image production, because excellent quality is also required for an image captured when an angle of view is changed by a pan-tilt drive operation (hereinafter, called PT drive), it is necessary to execute image capturing with an object framed within a position desired by the user.

In execution of the auto-tracking function, a dead zone is set to prevent the camera from executing the PT drive in response to a small movement of the object. With the setting, the camera does not execute PT drive in response to a movement of the object within the dead zone and executes PT drive only when the object has moved out of the dead zone, which achieves the auto-tracking function with less occurrence of slight changes in the angle of view due to a small movement of the object.

Japanese Patent Application Laid-Open No. 2002-171438 discusses an auto-tracking apparatus which automatically tracks a moving object by factoring in a dead zone only when a moving speed of the moving object is slow, and automatically tracks a moving object regardless of the dead zone when a moving speed of the moving object is fast.

According to Japanese Patent Application Laid-Open No. 2002-171438, since auto-tracking is executed while factoring in the dead zone when a moving speed of the object is slow, the auto-tracking apparatus starts executing PT drive after the object moves out from the dead zone. Consequently, the object is tracked within a position deviated from a position desired by the user.

SUMMARY OF THE DISCLOSURE

According to an aspect of the present disclosure, a tracking apparatus includes a memory storing instructions, and a processor that implements the instructions as a first controller that executes image capturing direction control by pan drive or tilt drive to capture an object within a predetermined position, and a second controller, different from the first controller, that executes angle of view control by shifting an angle of view of an image capturing apparatus to capture the object within the predetermined position, wherein tracking the object is executed by at least any one of the first controller and the second controller, wherein the first controller determines whether to execute the image capturing direction control by the first controller, based on a shift amount of the angle of view determined based on a moving amount of the object.

Further features of the present disclosure will become apparent from the following description of exemplary embodiments with reference to the attached drawings.

DESCRIPTION OF THE EMBODIMENTS

Hereinafter, exemplary embodiments of the present disclosure will be described in detail with reference to the accompanying drawings. The following exemplary embodiments are merely examples for implementing the present disclosure and should be appropriately modified or changed depending on the configuration of an apparatus to which the present disclosure is applied and various conditions. The present disclosure is not limited to the following exemplary embodiments and may be configured by appropriately combining parts of the exemplary embodiments described below.

<Configuration of Apparatus>

Figure 1:
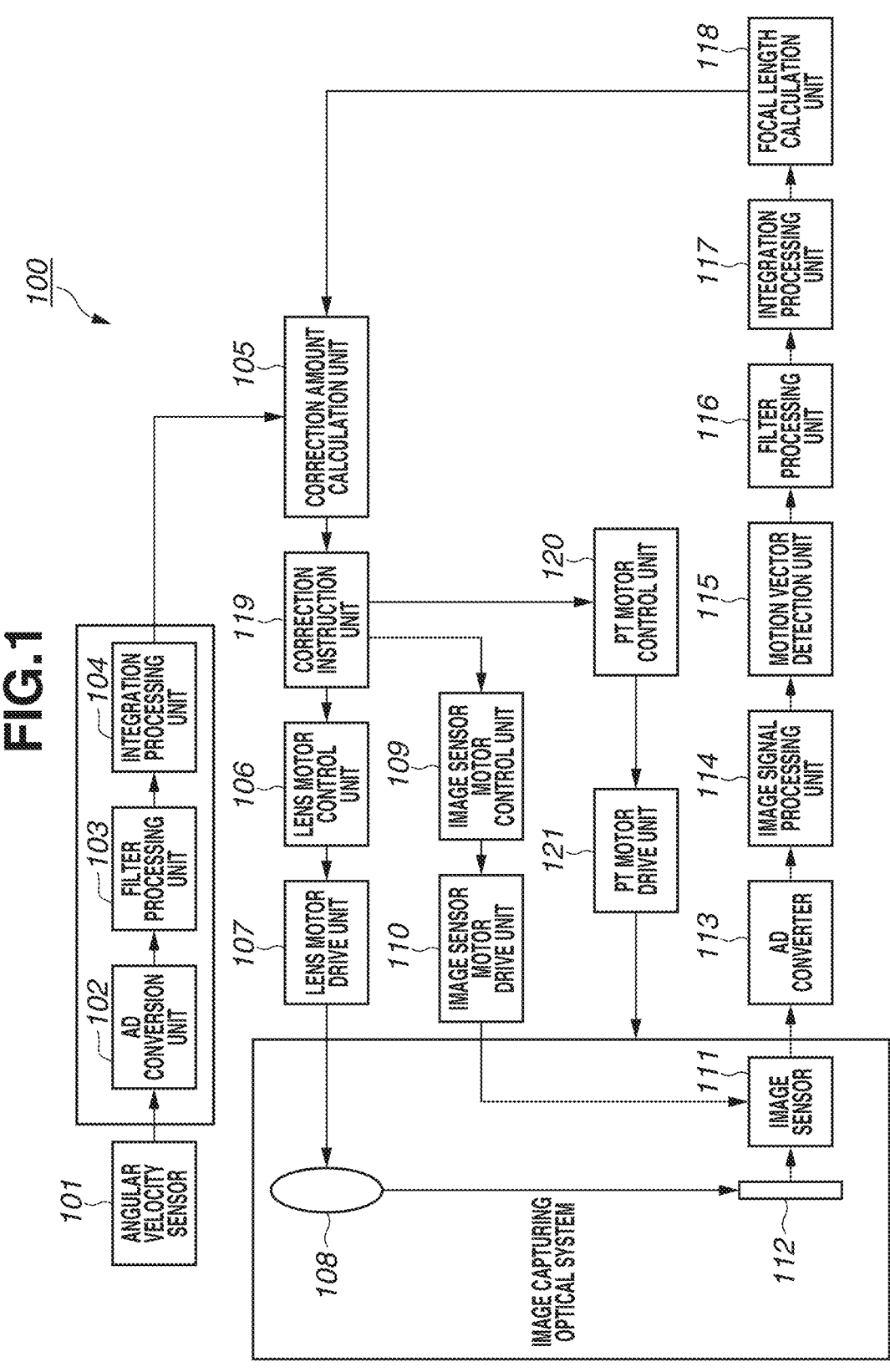
FIG. 1 is a block diagram illustrating a configuration of an image capturing apparatus.

First, an image capturing apparatus (auto-tracking apparatus) 100 according to a first exemplary embodiment will be described with reference to FIG. 1. FIG. 1 is a block diagram of an image capturing apparatus 100.

An angular velocity sensor 101 acquires vibration generated in the image capturing apparatus 100 as an angular velocity signal, and an analog-to-digital (AD) conversion unit 102 outputs the angular velocity signal as a digital signal. A filter processing unit 103 filters the output digital signal at a predetermined frequency band by using a high-pass filter (HPF) and a low-pass filter (LPF). After the filtering, an integration processing unit 104 executes integration to obtain a blurring amount of the image capturing apparatus 100.

A correction amount calculation unit 105 calculates a correction amount based on the blurring amount. The correction amount calculated by the correction amount calculation unit 105 is transmitted to a correction instruction unit 119.

In accordance with a control state of the image capturing apparatus 100, such as an anti-vibration state or an auto-tracking state, the correction instruction unit 119 transmits a drive amount to a motor drive unit and a motor control unit of each anti-vibration mechanism.

In an optical anti-vibration mechanism, the drive amount is output to a lens motor control unit 106 to cause the lens motor control unit 106 to execute control to drive a lens motor drive unit 107. In response to the lens motor drive unit 107 being driven, a shift lens 108 of the optical anti-vibration mechanism is moved, whereby a light flux appropriately travels with respect to an optical axis, which results in correction of blurring.

In an image sensor anti-vibration mechanism, the drive amount is output to an image sensor motor control unit 109 to cause the image sensor motor control unit 109 to execute control to drive an image sensor motor drive unit 110. In response to the image sensor motor drive unit 110 being driven, an image sensor 111 is moved in a direction perpendicular to the optical axis, whereby a light flux appropriately travels with respect to the optical axis, which results in correction of blurring.

In FIG. 1, light that has passed through the shift lens 108 and other lens groups is condensed on the image sensor 111. Other lens groups include a focus lens for adjusting a focus to the object and a zoom lens for adjusting an angle of view.

Light that has entered the image capturing apparatus 100 after passing through a plurality of lens groups passes through an optical filter 112, such as an infrared cut filter, and is incident on the image sensor 111.

After luminance adjustment is performed on an image signal of the image formed on the image sensor 111, an AD converter 113 converts the analog image signal into a digital image signal.

An image signal processing unit 114 executes predetermined processing on the digital image signal transmitted from the AD converter 113 to output a luminance signal and a color signal of each pixel. This processing is for generation of an output image and various parameters to be used for aperture control and focus adjustment control. The image signal processing unit 114 has an electronic anti-vibration function. The function is for correction of blurring by cutting out the image captured by the image capturing apparatus 100 based on a correction amount calculated by the correction amount calculation unit 105.

A motion vector detection unit (detection unit) 115 detects a motion vector amount by acquiring a difference between a current frame and a previous frame based on these image signals. A filter processing unit 116 executes filtering processing on the motion vector amount at a predetermined frequency band. Because the motion vector amount corresponds to a moving amount of the object, a detection result of the motion vector detection unit 115 is a moving amount of the object.

An integration processing unit 117 calculates a blurring amount by integrating the motion vector amount filtered by the filtering processing. A focal length calculation unit 118 adjusts the blurring amount to a blurring amount adapted to a focal length. The correction amount calculation unit 105 calculates a correction amount based on the blurring amount calculated by the focal length calculation unit 118.

The correction amount calculated by the correction amount calculation unit 105 is transmitted to the correction instruction unit 119.

In accordance with a control state of the image capturing apparatus 100, such as an anti-vibration state or an auto-tracking state, the correction instruction unit 119 transmits a drive amount to a motor drive unit and a motor control unit for panning and tilting of each anti-vibration mechanism.

A pan-tilt (PT) motor control unit (first control unit) 120 outputs the drive amount to a PT motor drive unit (drive unit) 121, and the PT motor drive unit 121 drives a PT motor to change an image capturing direction of the image capturing apparatus 100. In response to the PT motor drive unit 121 driving the PT motor, an image capturing optical system including the lens and the sensor is moved in a pan direction or a tilt direction about a drive axis of the PT motor drive unit 121.

A PT motor velocity acquisition unit measures and acquires an actual angular velocity of the PT motor drive unit 121.

<Conventional Tracking Operation>

Figure 2:
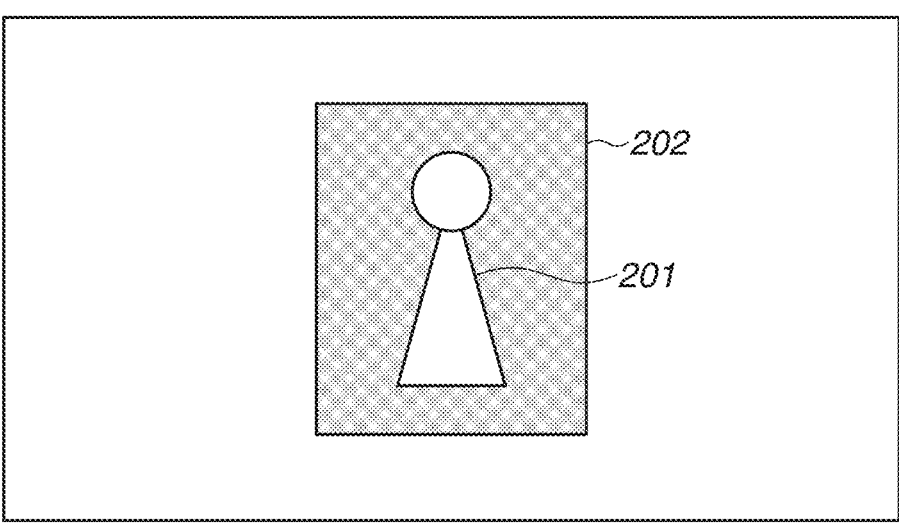
FIG. 2 is a diagram illustrating a conventional auto-tracking method.

Next, a conventional auto-tracking will be described with reference to FIGS. 2 and 3. FIG. 2 illustrates an auto-tracking user setting screen. In execution of the auto-tracking, the user firstly sets an object setting position (predetermined position) 201 to obtain a desired composition. The image capturing apparatus 100 drives the PT motor drive unit 121 in such a manner that the object is captured within the object setting position 201.

Next, the user sets a size of a dead zone 202. A dead zone is set a zone that is set to prevent the image capturing apparatus 100 from executing PT drive in the zone in response to a small movement of an object such as a shake of the object.

When the object falls outside the dead zone 202, the image capturing apparatus 100 determines that the object has moved, and executes PT drive to capture the object within the object setting position 201.

Figure 3:
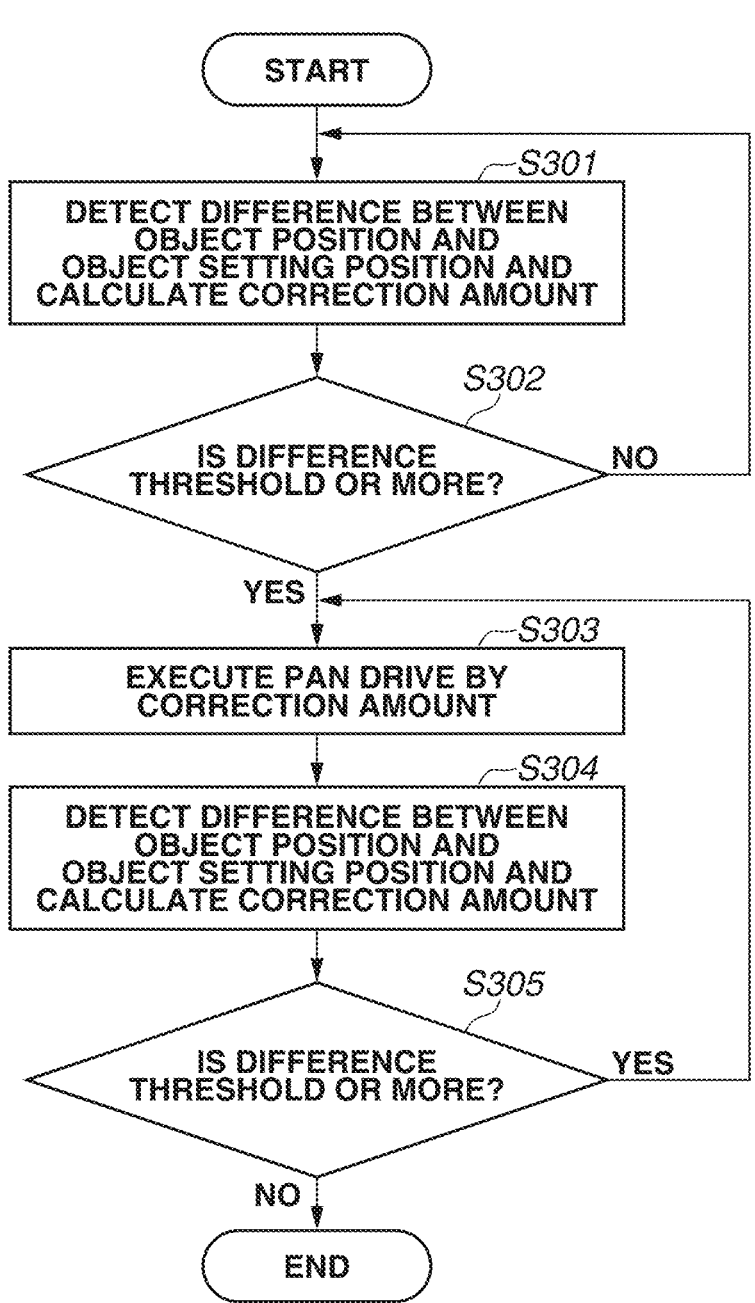
FIG. 3 is a flowchart illustrating a conventional auto-tracking method.

FIG. 3 is a flowchart illustrating a conventional auto-tracking method. The dead zone 202 that has been set in advance is set as a threshold for a difference between the object setting position 201 and a current object position or a threshold for a correction amount calculated by the correction amount calculation unit 105. In the present exemplary embodiment, the auto-tracking method is described by taking the latter case as an example.

When the object in the object setting position 201 starts moving, in step S301, the motion vector detection unit 115 detects a motion vector, and the correction amount calculation unit 105 calculates a correction amount based on the detected moving amount.

In step S302, the image capturing apparatus 100 determines whether the correction amount is more than or equal to a threshold. In a case where the correction amount is less than the threshold (NO in step S302), the processing returns to step S301.

In a case where the correction amount is more than or equal to the threshold (YES in step S302), the processing proceeds to step S303. In step S303, the PT motor drive unit 121 executes pan drive by the correction amount.

In step S304, the correction amount calculation unit 105 calculates a correction amount from the motion vector detected by the motion vector detection unit 115 again.

In step S305, the image capturing apparatus 100 determines whether the correction amount is more than or equal to the threshold. In a case where the correction amount is more than or equal to the threshold (YES in step S305), the processing returns to step S303. In step S303, the PT motor drive unit 121 executes pan drive by the correction amount.

In a case where the correction amount is less than the threshold (NO in step S305), the object falls inside the dead zone 202. Thus, the image capturing apparatus 100 determines that the object stops moving, and stops the PT motor drive unit 121 to end the auto-tracking.

As described above, since determination of whether the object has moved is executed based on the dead zone 202, the object is always tracked and captured within a position deviated from the center, i.e., a position deviated from the object setting position 201 set by the user.

Tracking Operation According to the Present
Exemplary Embodiment

Next, the auto-tracking operation according to the present exemplary embodiment is described with reference to FIG.

5

4. According to the present exemplary embodiment, the auto-tracking operation is implemented by using both image capturing direction control using the PT motor control unit (first control unit) 120 and control of the angle of view of the image capturing apparatus 100 using a second control unit.

Figure 4:
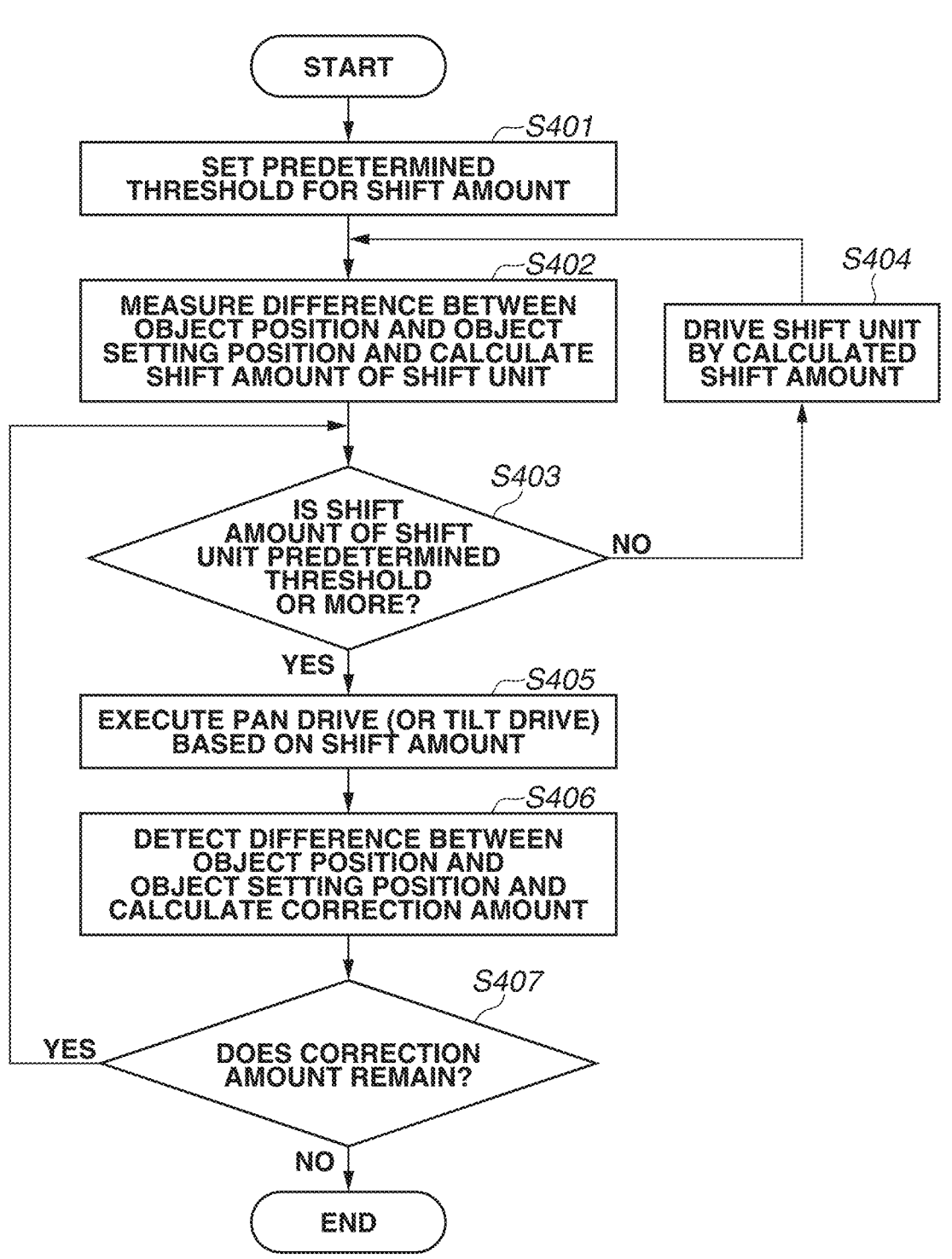
FIG. 4 is a flowchart illustrating control according to a first exemplary embodiment.

FIG. 4 is a flowchart illustrating an auto-tracking method according to the present exemplary embodiment. The flowchart in FIG. 4 is implemented by a central processing unit (CPU), of the below-described hardware configuration of the image capturing apparatus 100, reading a program stored in a random access memory (RAM) or a read only memory (ROM).

In the present exemplary embodiment, for the sake of simplicity, the auto-tracking operation is described by using a case where the PT motor drive unit 121 is driven only in a pan direction. However, the same is also applicable to a case where the PT motor drive unit 121 is driven in a tilt direction.

Different from the first control unit, the second control unit executes control to shift the angle of view of the image capturing apparatus 100 without driving the PT motor drive unit 121. Each specific shift unit for shifting the angle of view is described below.

In step S401, a predetermined threshold is set for a shift amount of the angle of view to be shifted by the second control unit.

As the predetermined threshold, for example, a maximum variation amount of the angle of view shiftable by the second control unit or 10 percent (predetermined percent) of the variation amount which takes the non-shifted angle of view as a reference may be set. A setting method of the predetermined threshold is not limited to the above described methods, and various modifications and changes are possible within the scope of the present disclosure.

When the object starts moving, in step S402, the correction amount calculation unit (second control unit) 105 calculates a correction amount from the motion vector detected by the motion vector detection unit (detection unit) 115. In other words, a moving amount of the object is detected based on the image captured by the image capturing apparatus 100, and a shift amount calculated by the correction amount calculation unit 105 is transmitted to the correction instruction unit (second control unit) 119.

In step S403, the correction instruction unit 119 determines whether the shift amount calculated by the correction amount calculation unit 105 is more than or equal to the threshold.

In a case where the shift amount is less than the predetermined threshold (NO in step S403), the processing proceeds to step S404. In step S404, the second control unit uses the shift unit to shift the angle of view by the calculated shift amount. In a case where the shift amount is more than or equal to the predetermined threshold (YES in step S403), the processing proceeds to step S405. In step S405, the first control unit executes control to cause the PT motor drive unit 121 to execute pan drive (or tilt drive) by the correction amount. As described above, based on the shift amount of the second control unit, the first control unit determines whether to execute the image capturing direction control using the drive unit. A drive amount of the PT motor drive unit 121 is determined by the PT motor control unit 120 based on the shift amount.

For example, the drive amount may be determined such that the difference between the shift amount of the shift unit and the predetermined threshold is resolved. Alternatively, instead of shifting using the shift unit, the calculated shift amount is converted into a drive amount of the PT motor drive unit 121.

<Shift Unit>

While there is a plurality of methods applicable to the shift unit, in the present exemplary embodiment, at least one shift unit may be employed. A plurality of shift units may also be employed and switching the plurality of shift units may be executed in accordance with the calculated shift amount.

As a first shift unit, a method employing an optical anti-vibration function using the shift lens 108 may be used. The lens motor control unit 106 drives the lens motor drive unit 107 to move the shift lens 108, based on the calculated shift amount, whereby the angle of view of the image capturing apparatus 100 is shifted.

As a second shift unit, a method employing an image sensor anti-vibration function using the image sensor 111 may be used. The image sensor motor control unit 109 drives the image sensor motor drive unit 110 to move the image sensor 111, based on the calculated shift amount, whereby the angle of view of the image capturing apparatus 100 is shifted.

In a case of correction using the image sensor 111, the correction amount is changed in accordance with a focal length. For example, a correction amount D can be expressed by Formula 1 when a correction angle is $\Theta$ and a focal length is F.

$$D = f \cdot \tan\theta \qquad (1)$$

This calculation method is merely an example, and a calculation method can be modified or changed in various ways within the scope of the present disclosure.

As a third shift unit, a method employing image cutout processing using the image signal processing unit 114 may be used. The image signal processing unit 114 moves a cutout position in the captured image in accordance with the calculated shift amount, whereby the angle of view of the image capturing apparatus 100 is shifted in a pseudo manner.

The above-described shift units are merely examples, and various modifications and changes are possible as long as the method is different from the method of the image capturing direction control by the drive unit (PT motor drive unit 121).

In the conventional tracking method, execution or non-execution of PT drive is determined based on determination of whether the object falls inside or outside the dead zone. In the tracking method according to the present exemplary embodiment, execution or non-execution of PT drive is determined by using a shift amount of the shift unit, such as the shift lens 108, as a threshold.

Next, in step S406, the correction amount calculation unit 105 calculates a correction amount from the motion vector detected by the motion vector detection unit 115.

In step S407, in a case where the correction amount remains (YES in step S407), the object is still moving or is not captured within a position desired by the user. Thus, the processing returns to step S403. In a case where the correction amount does not remain (NO in step S407), the object stops moving. Thus, the tracking operation is ended.

In order to determine a stopped state of the object in step S407, a threshold, factoring in a shake of the object, may be set.

According to the present exemplary embodiment, in response to a small movement of the object, the auto-tracking apparatus can track the object through the angle of view control that is executed by the second control unit. Further, with respect to a dynamic movement of the object, because a shift amount is more than or equal to a predetermined threshold, the auto-tracking apparatus can track the object through the PT drive control that is executed by the first control unit. Furthermore, in comparison with the conventional method in which a dead zone is set, the auto-tracking apparatus can automatically track the object with less deviation between the actual position and the object setting position 201.

An issue in the conventional method in which a dead zone is set is a loss of tracking capability in response to a movement of the object within the dead zone. If the dead zone is simply removed, the auto-tracking apparatus executes PT drive even in response to a small movement of the object. Generally, because PT drive is not suitable for a small movement, PT drive exhibits unstable behavior without the dead zone.

According to the auto-tracking apparatus (method) of the present exemplary embodiment, object tracking can be executed such that the angle of view is minutely shifted by shifting the shift lens or the image sensor in response to the small movement of the object. In response to the dynamic movement of the object, for which the above-described shift unit is not suitable, a threshold for a shift amount of the shift unit is set, whereby changing to the auto-tracking using PT drive can be executed at an appropriate timing. With this configuration, image capturing with high tracking capability with less deviation between the actual position and the object setting position 201 can be executed.

In the first exemplary embodiment, the tracking method that uses image capturing direction control using the PT motor control unit (first control unit) 120 and control of the angle of view of the image capturing apparatus 100 using the second control unit has been described.

In a second exemplary embodiment, a tracking method using a dead zone in addition to the method described in the first exemplary embodiment will be described.

An apparatus configuration of the image capturing apparatus 100 (auto-tracking apparatus) according to the present exemplary embodiment is similar to the configuration described in the first exemplary embodiment. Thus, redundant descriptions are omitted.

Figure 5:
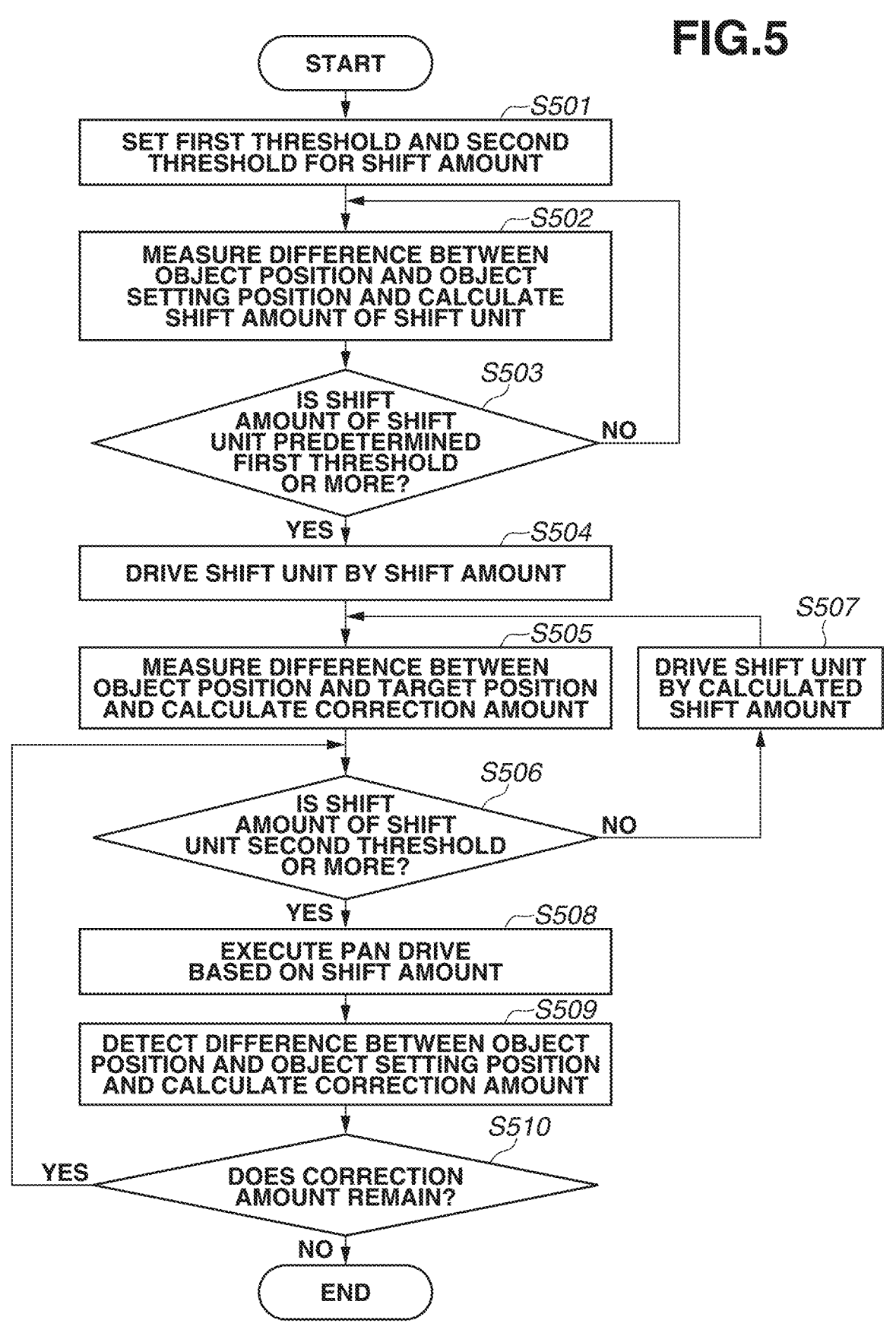
FIG. 5 is a flowchart illustrating control according to a second exemplary embodiment.

FIG. 5 is a flowchart illustrating the operation of the image capturing apparatus 100 according to the present exemplary embodiment. The flowchart in FIG. 5 is implemented by the CPU, of the below-described hardware configuration of the image capturing apparatus 100, reading a program stored in the RAM or the ROM. Redundant detailed descriptions with respect to the operation similar to the operation described in the first exemplary embodiment are omitted. The present exemplary embodiment is different from the first exemplary embodiment in terms of the operation executed in steps S501, S503, and S504.

In step S501, two thresholds, i.e., a first threshold and a second threshold, are set.

In step S503, the image capturing apparatus 100 determines whether a shift amount of the shift unit is more than or equal to the first threshold. The first threshold corresponds to a dead zone of the conventional tracking method, so that control is executed such that the second control unit does not shift the angle of view with respect to an object movement allowable by the user. In a case where the shift amount is less than the first threshold (NO in step S503), the processing returns to step S502. In a case where the shift amount is more than or equal to the first threshold (YES in step S503), the processing proceeds to step S504. In step S504, driving by the correction amount is executed by the shift unit. The second threshold is a threshold to be used in step S506, and the second threshold corresponds to the predetermined threshold described in the first exemplary embodiment. It is desirable that the second threshold should be greater than the first threshold. This is because the first threshold is a threshold for setting a dead zone with respect to a small movement of the object as described above, and the second threshold is a threshold for determining whether to track the object by PT drive.

In the first exemplary embodiment, since the angle of view control is executed even in response to the small movement of the object, there is a risk that image quality is degraded due to small variations in the angle of view.

According to the auto-tracking method of the present exemplary embodiment, firstly, driving or not driving of the shift unit with respect to the moving amount of the object in auto-tracking is determined, whereby the shift unit is prevented from being driven in response to the ignorable small movement of the object.

Secondly, the drive amount of the shift unit, such as the shift lens 108, is set as a threshold in driving of the shift unit, determination of whether to execute the image capturing direction control using PT drive can be executed.

With this configuration, in addition to the advantage that excessive tracking of a small movement of the object is prevented when auto-tracking is executed, the user can obtain a tracked image with less deviation between the actual object position and the object position desired by the user.

In the present exemplary embodiment, a dead zone is used as a threshold for a shift amount to be shifted by the second control unit. However, as a variation example, a dead zone may simply be used as a reference for determination of whether the angle of view control is executed by the first control unit or the second control unit. For example, the image capturing apparatus 100 determines whether a movement of the object captured in an image is detected inside a dead zone set to the image. Based on a result of the determination, the image capturing apparatus 100 switches between the angle of view control by the first control unit and the angle of view control by the second control unit. More specifically, in a case where the movement of the object is determined as a movement detected inside the dead zone, the image capturing apparatus 100 tracks the object through the angle of view control by the second control unit. In a case where the movement of the object is determined as a movement detected outside the dead zone, the image capturing apparatus 100 tracks the object through the angle of view control by the first control unit. As a method for determination of whether a movement of the object is detected inside the dead zone, for example, a method for calculating a motion vector of the object between frames and determining whether the calculated motion vector crosses the boundary between the outside and the inside of the dead zone may be used. Alternatively, another method for setting a threshold for a motion vector based on a size of the dead zone and determining whether the size of the motion vector is more than or equal to a predetermined size may be used.

In the first exemplary embodiment, a tracking method that uses the image capturing direction control using the PT motor control unit (first control unit) 120 and control of the angle of view of the image capturing apparatus 100 using the second control unit has been described. In a third exemplary embodiment, a tracking method in which, in addition to the method described in the first exemplary embodiment, switching a plurality of shift units is executed in accordance with a calculated shift amount will be described.

Figure 6:
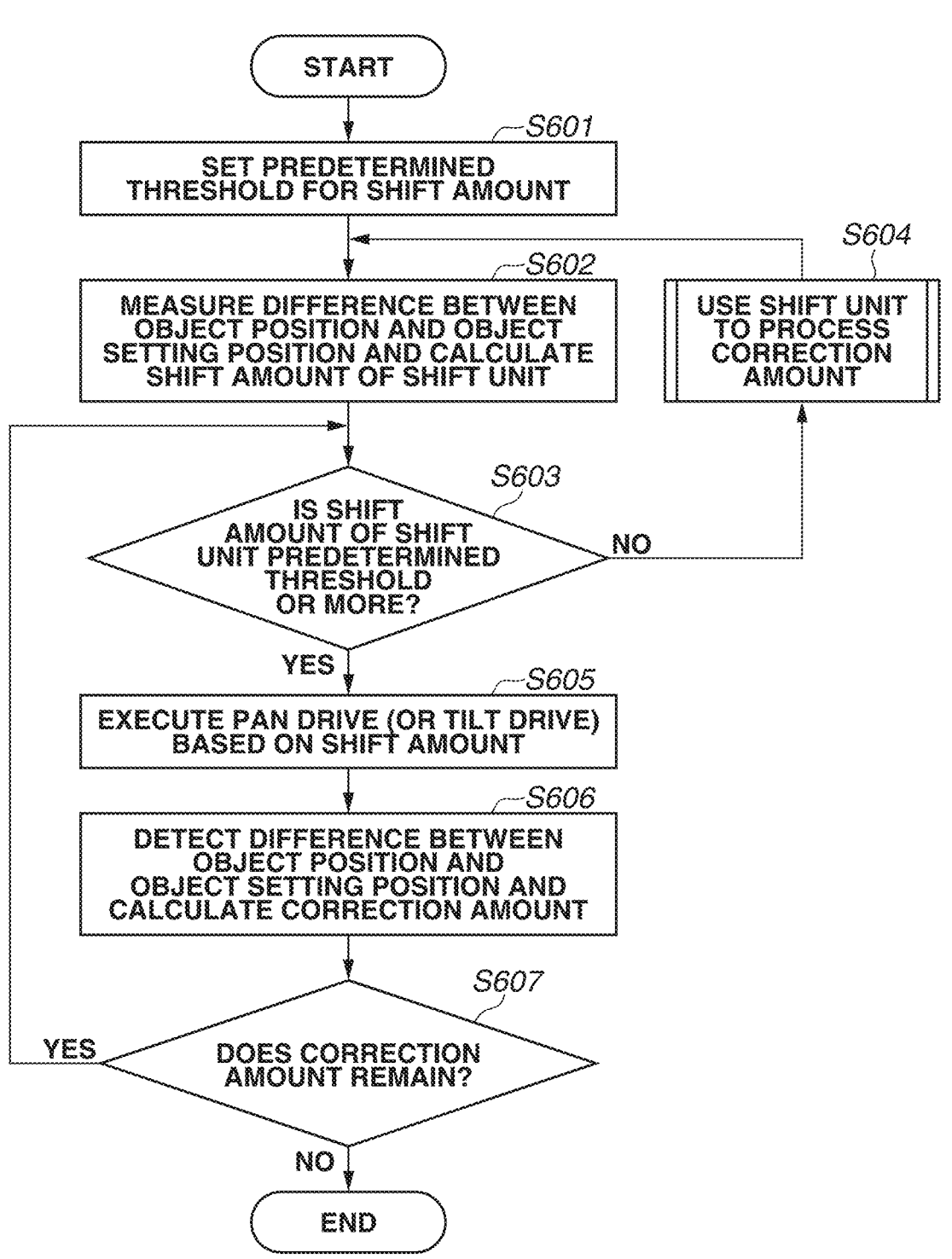
FIG. 6 is a flowchart illustrating control according to a third exemplary embodiment.
Figure 7:
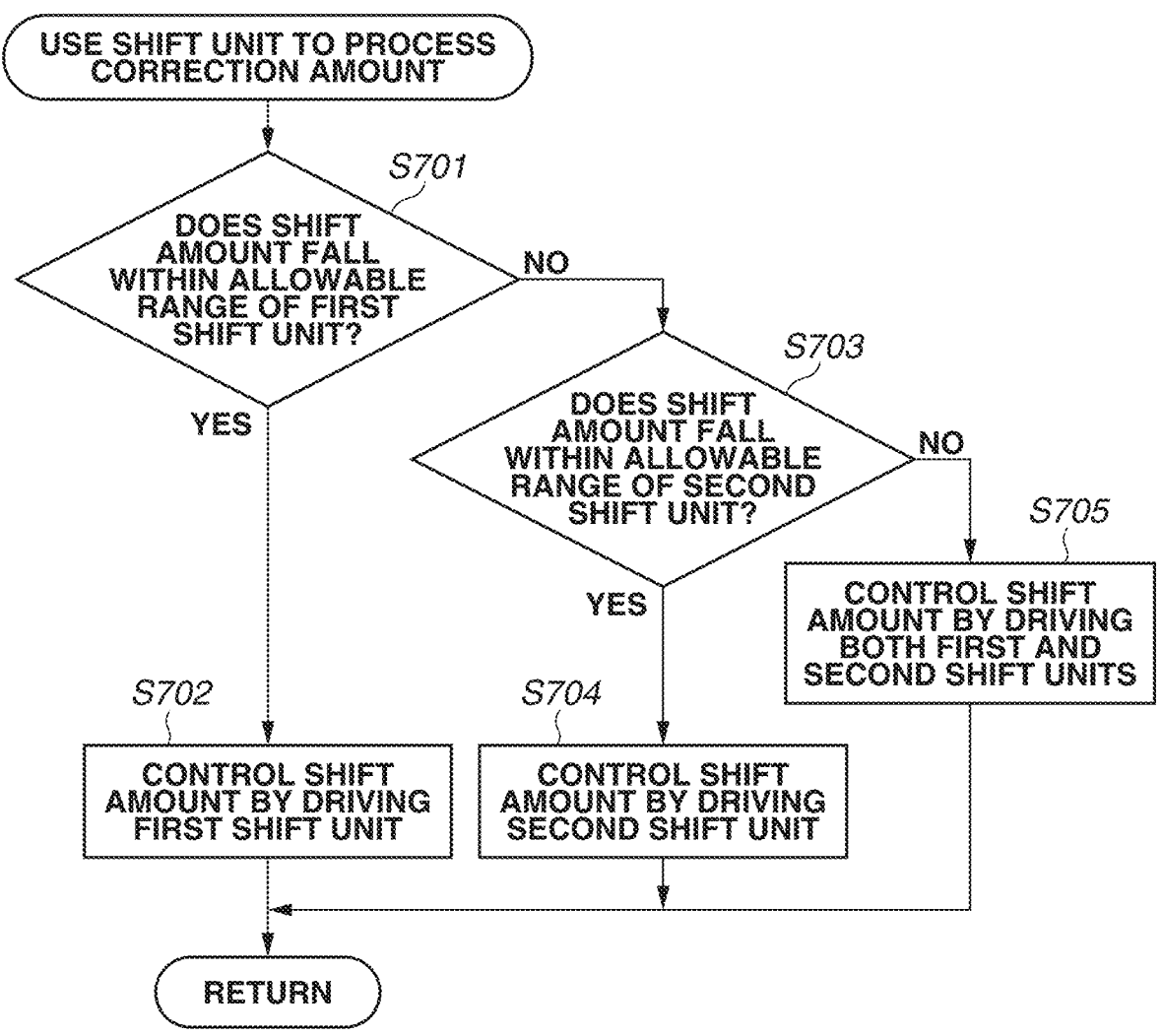
FIG. 7 is a flowchart illustrating control according to the third exemplary embodiment.

FIGS. 6 and 7 are flowcharts illustrating the operation of the image capturing apparatus 100 according to the present exemplary embodiment. The flowcharts in FIGS. 6 and 7 are implemented by the CPU, of the below-described hardware configuration of the image capturing apparatus 100, reading a program stored in the RAM or the ROM. Redundant detailed descriptions are omitted with respect to the operation similar to the operation described in the first exemplary embodiment. The present exemplary embodiment is different from the first exemplary embodiment in terms of the operation executed in steps S701 to S705 of step S604.

In the first exemplary embodiment, with respect to the shift unit, a method employing the optical anti-vibration function (first shift unit) for moving the shift lens and the image sensor anti-vibration function (second shift unit) for moving the image sensor has been described. The difference in the shift units is the allowable correction angle. For example, the allowable correction angle of the optical anti-vibration function is constant and does not depend on a focal distance, whereas the allowable correction angle of the image sensor anti-vibration function is determined by a limiting drive amount and a focal length of the image sensor.

An allowable correction angle $\Theta$ can be expressed by Formula 2 when a limiting drive amount is D and a focal length is F.

$$\Theta = \mathrm{ARCTAN}\left(\frac{d}{f}\right) \qquad (2)$$

According to Formula 2, the allowable correction angle is narrow when a focal length is long, and the allowable correction angle is wide when a focal distance is short. This calculation method is merely an example, and a calculation method can be modified or changed in various ways within the scope of the present disclosure.

In step S701, the image capturing apparatus 100 determines whether the shift amount falls within the allowable range of the first shift unit. In a case where the shift amount falls within the allowable range (YES in step S701), the processing proceeds to step S702. In a case where the shift amount falls outside the allowable range (NO in step S701), the processing proceeds to step S703.

In step S702, the image capturing apparatus 100 drives the lens motor drive unit 107 by the shift amount through the optical anti-vibration function using the shift lens.

In step S703, the image capturing apparatus 100 determines whether the shift amount falls within the allowable range of the second shift unit. In a case where the shift amount falls within the allowable range (YES in step S703), the processing proceeds to step S704. In a case where the shift amount falls outside the allowable range (NO in step S703), the processing proceeds to step S705.

The allowable range of the second shift unit in step S704 may be calculated each time from the focal length and the driving range of the image sensor.

In step S705, the image capturing apparatus 100 drives the image sensor motor drive unit 110 by the correction amount through the image sensor anti-vibration function using the image sensor.

In step S705, the image capturing apparatus 100 drives the lens motor drive unit 107 and the image sensor motor drive unit 110 by using both the first and the second shift units.

As described above, a threshold for a shift amount of the shift unit is set based on at least any one of the focal lengths, the optical information on the image capturing apparatus 100, such as the focal length, and the limiting drive amount (maximum shift amount) of the shift unit.

According to the present exemplary embodiment, in a case of the auto-tracking apparatus including both the optical anti-vibration mechanism and the image sensor anti-vibration mechanism as the shift units, the anti-vibration mechanism to be used for correction is selected in accordance with the focal length of the optical system.

In this way, even in a case where a required correction angle exceeds the allowable correction angle of the optical anti-vibration mechanism, correction can be executed by the image sensor anti-vibration mechanism. The processing sequence is not limited to the above-described sequence, and can be modified or changed in various ways within the scope of the present disclosure.

In the first exemplary embodiment, a tracking method that uses image capturing direction control using the PT motor control unit (first control unit) 120 and control of the angle of view of the image capturing apparatus 100 using the second control unit has been described. In the first exemplary embodiment, the angle of view control by the second control unit is ended in a state where the shift unit for moving the shift lens or the image sensor remains in a driving state. Consequently, the shift unit is deviated from the optical axis center, and the quality of the image acquired at the time of ending the tracking operation is deteriorated in comparison with the normal quality. On the other hand, if the shift unit is simply brought back to the original state, the angle of view is changed when the shift unit is moved, in which case an undesirable image is provided to the user.

In a fourth exemplary embodiment, a method of stopping the auto-tracking operation executed by the image capturing apparatus 100 (auto-tracking apparatus) according to the present exemplary embodiment is described, in addition to the method described in the first exemplary embodiment. Redundant detailed descriptions are omitted with respect to the configuration similar to the configuration described in the first exemplary embodiment.

Figure 8:
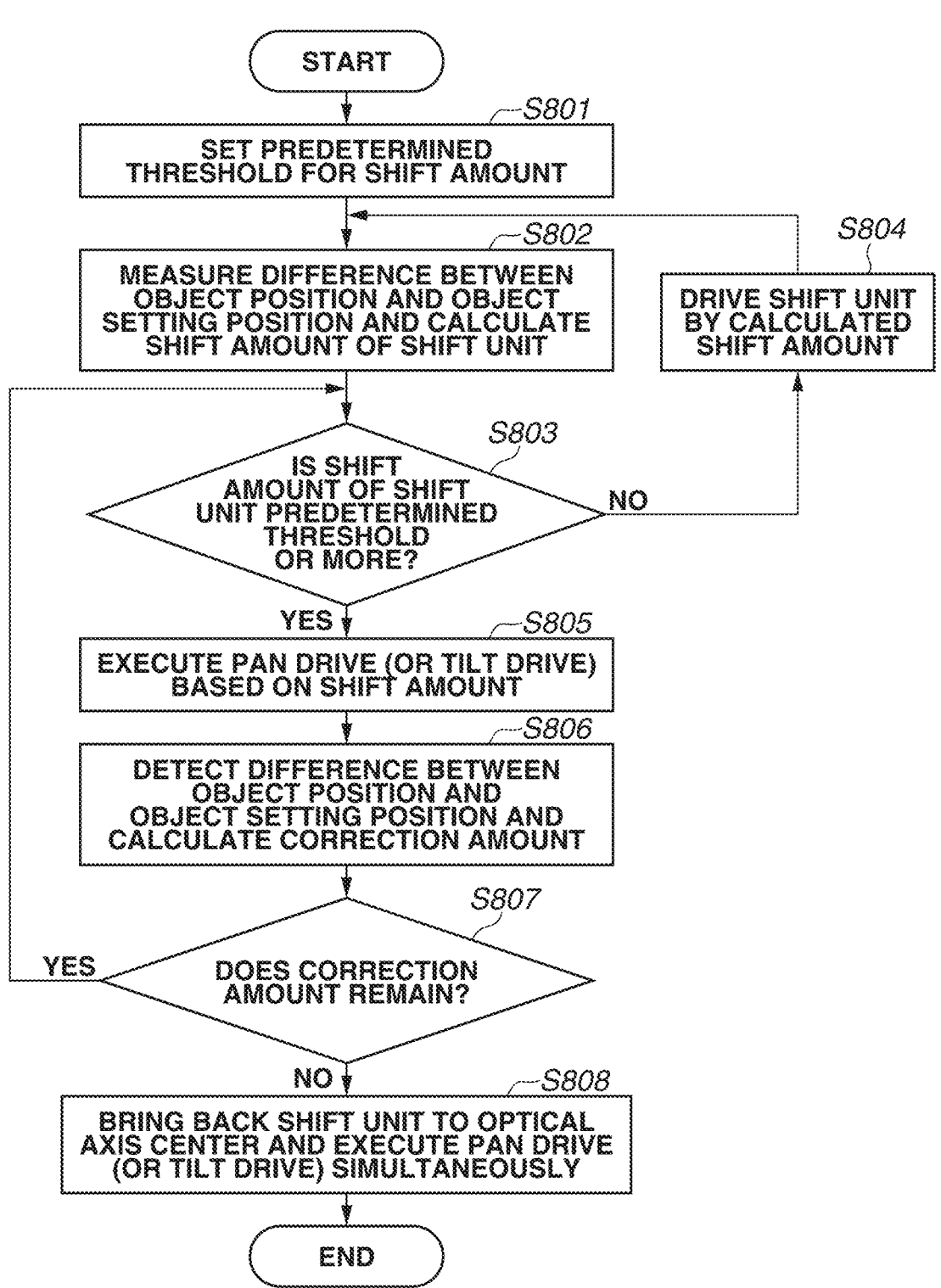
FIG. 8 is a flowchart illustrating control according to a fourth exemplary embodiment.

FIG. 8 is a flowchart illustrating the operation of the image capturing apparatus 100 according to the present exemplary embodiment. The flowchart in FIG. 8 is implemented by the CPU, of the below-described hardware configuration of the image capturing apparatus 100, reading a program stored in the RAM or the ROM. Redundant detailed descriptions are omitted with respect to the operation similar to the operation described in the first exemplary embodiment. The present exemplary embodiment is different from the first exemplary embodiment in terms of a series of processing executed in step S808.

When the object stops moving, in step S808, the image capturing apparatus 100 stops executing pan drive, and brings back the shift unit to the optical center by driving the lens motor drive unit 107 or the image sensor motor drive unit 110. In this operation, if the shift unit is simply brought back to the optical center, the angle of view is changed as described above.

Thus, in a case where the angle of view is to be brought back to a non-shifted state from a shifted state where the angle of view is shifted by the second control unit, the first control unit executes the image capturing direction control by using the PT motor drive unit (drive unit) 121 to maintain a state of the angle of view shifted based on the shift amount of the shift unit.

More specifically, the first control unit executes the control by converting the amount of variation in the angle of view caused by the shift unit into the amount of variation in the angle of view caused by the PT motor drive unit 121.

Figure 9:
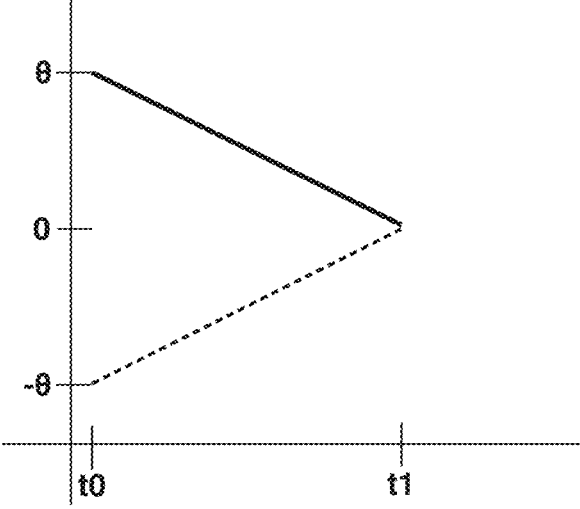
FIG. 9 is a graph illustrating angles of a shift unit and a pan-tilt drive unit and time.

The shift unit and the PT motor drive unit 121 are driven as illustrated in FIG. 9. FIG. 9 is a graph illustrating angles of the shift unit and the PT motor drive unit 121 and time. A solid line represents the shift unit, and a dotted line represents the PT motor drive unit 121 (pan-tilt drive unit). A vertical axis represents an angle, and a horizontal axis represents time. At time t0, a drive amount of the shift unit is $\Theta°$, whereas a drive amount of the PT motor drive unit 121 is $-\Theta°$. A position of the optical center of the shift unit is $0°$.

In a case where the shift unit is to be brought to the optical center at time t1, the PT motor drive unit 121 is driven in an opposite direction at an angular velocity the same as that of the shift unit. In this way, the shift unit is brought back to the optical center without changing the angle of view.

In a case where the auto-tracking apparatus executes the above-described operation after stopping the PT motor drive unit 121, the angular velocity of the shift unit and the angular velocity of the PT motor drive unit 121 have to be precisely matched.

Therefore, for example, at a timing when the auto-tracking apparatus stops the PT motor drive unit 121 (for example, in deceleration processing before stopping the PT motor drive unit 121), the auto-tracking apparatus additionally executes PT drive by the correction angle of the shift unit. Then, the auto-tracking apparatus drives and brings back the shift unit to the optical center.

In this processing, the auto-tracking apparatus executes PT drive at the angular velocity greater than the angular velocity of the shift unit, and stops the shift unit before stopping the PT drive. In this way, the auto-tracking apparatus can stop the PT motor drive unit 121 while bringing back the shift unit to the optical center, without giving the user a sense of discomfort.

According to the present exemplary embodiment, when the shift unit is to be brought back to the optical axis center, the PT motor drive unit 121 is simultaneously driven in a direction opposite to the direction in which the angle of view is changed with driving of the shift unit to be brought back to the optical axis center, whereby deterioration of the image can be suppressed without giving the user a sense of discomfort.

Figure 10:
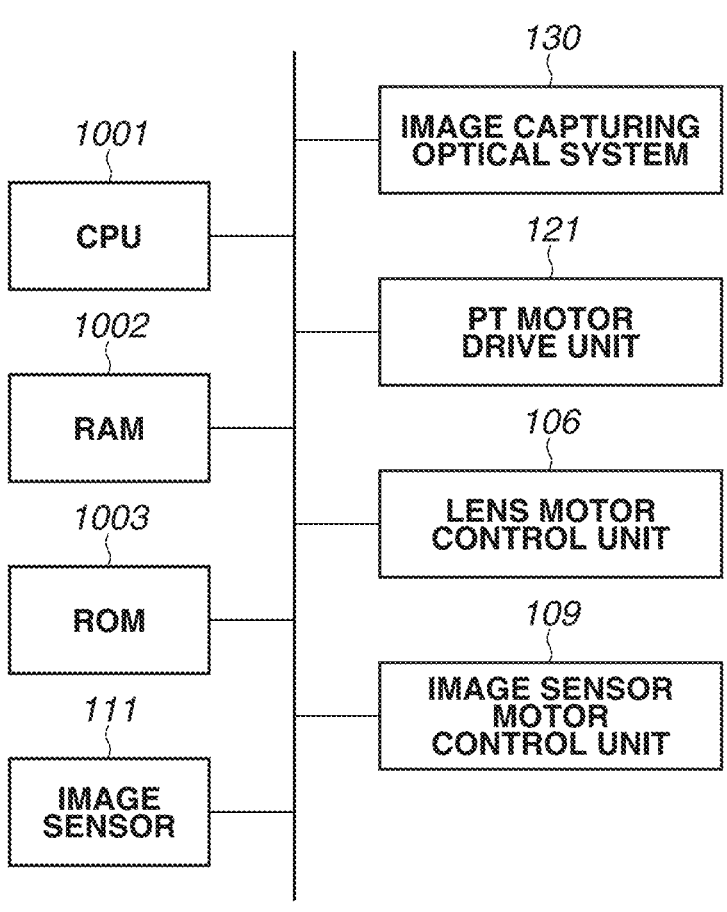
FIG. 10 is a diagram illustrating a hardware configuration of the image capturing apparatus according to the first to the fourth exemplary embodiments.

Hardware Configuration of Image Capturing Apparatus According to the First to the Fourth Exemplary Embodiments FIG. 10 is a diagram illustrating the hardware configuration of the image capturing apparatus 100 according to the first to the fourth exemplary embodiments. The same reference numerals are applied to elements similar to those illustrated in FIG. 1, and the redundant descriptions are omitted. With respect to a function of a functional block implemented by software, from among the functions of the functional blocks for constituting the image capturing apparatus 100 according to the first to the fourth exemplary embodiment, a program for providing the function thereof is stored in a memory such as a ROM 1003. A CPU 1001 implements the function by reading the program to a RAM 1002 and executing the program. For example, the lens motor control unit 106, the image sensor motor control unit

109, the PT motor drive unit 121, are the functions implemented by software. The image capturing apparatus 100 includes an image capturing optical system 130 including the image sensor 111, the shift lens 108, and the optical filter 112.

According to the present disclosure, auto-tracking image capturing with less deviation between an object position and a position desired by the user is executed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-012277, filed Jan. 30, 2023, which is hereby incorporated by reference herein in its entirety.

What is claimed is:

1. A tracking apparatus comprising:

a memory storing instructions; and a processor that implements the instructions as:

a first controller that executes image capturing direction control by pan drive or tilt drive to capture an object within a predetermined position, and a second controller, different from the first controller, that executes angle of view control by shifting an angle of view of an image capturing apparatus to capture the object within the predetermined position, wherein tracking the object is executed by at least any one of the first controller and the second controller, wherein the first controller determines whether to execute the image capturing direction control by the first controller, based on a shift amount of the angle of view determined based on a moving amount of the object, wherein in a case where the shift amount is more than or equal to a predetermined threshold, the first controller determines that the image capturing direction control by the first controller is executed, and in a case where the shift amount is less than the predetermined threshold, determines that the image capturing direction control by the first controller is not executed, wherein the predetermined threshold is determined based on at least any one of optical information on the image capturing apparatus and a maximum shift amount of the second controller.

2. The tracking apparatus according to claim 1, wherein the second controller shifts the angle of view by shifting an image capturing optical system or an image sensor.

3. The tracking apparatus according to claim 1, wherein the second controller shifts the angle of view by processing for cutting out an image captured by the image capturing apparatus to capture the object within the predetermined position.

4. The tracking apparatus according to claim 1, wherein a moving amount of the object is detected based on an image captured by the image capturing apparatus, and the second controller determines the shift amount based on the moving amount.

5. The tracking apparatus according to claim 1, wherein in a case where the angle of view is brought back to a non-shifted state from a shifted state where the angle of view has been shifted by the second controller, the first controller executes the image capturing direction control based on the shift amount in such a manner that the angle of view is maintained.

6. The tracking apparatus according to claim 1, further comprising a plurality of shift units that shift the angle of view, wherein the second controller switches the plurality of shift units based on the shift amount.

7. A tracking processing method comprising a processor for:

executing, as first control, image capturing direction control by pan drive or tilt drive to capture an object within a predetermined position;

executing, as second control different from the first control, angle of view control by shifting an angle of view of an image capturing apparatus to capture the object within the predetermined position; and automatically tracking the object through control that is executed by at least any one of the first control and the second control, wherein, in the first control, whether to execute the image capturing direction control by the first control is determined based on a shift amount of the angle of view determined based on a moving amount of the object, wherein, in the first control, in a case where the shift amount is more than or equal to a predetermined threshold, the image capturing direction control by the first control is determined to be executed, and in a case where the shift amount is less than the predetermined threshold, the image capturing direction control by the first control is determined not to be executed, wherein the predetermined threshold is a maximum shift amount of the second control.

8. The tracking processing method according to claim 7, wherein in the second control, the angle of view is shifted by shifting an image capturing optical system or an image sensor.

9. The tracking processing method according to claim 7, wherein in the second control, the angle of view is shifted by processing for cutting out an image captured by the image capturing apparatus to capture the object within the predetermined position.

10. The tracking processing method according to claim 7, further comprising detecting a moving amount of the object, based on an image captured by the image capturing apparatus, wherein in the second control, the shift amount is determined based on the moving amount.

11. The tracking processing method according to claim 7, wherein, in the first control, in a case where the angle of view is brought back to a non-shifted state from a shifted state where the angle of view has been shifted by the second control, the image capturing direction control is executed based on the shift amount in such a manner that the angle of view is maintained.

12. The tracking processing method according to claim 7, further comprising a plurality of pieces of shifting to shift the angle of view, wherein the second control switches the plurality of pieces of shifting based on the shift amount.

13. A non-transitory computer-readable storage medium storing a program for causing a computer to execute a method comprising:

executing, as first control, image capturing direction control by pan drive or tilt drive to capture an object within a predetermined position;

executing, as second control different from the first control, angle of view control by shifting an angle of view of an image capturing apparatus to capture the object within the predetermined position; and automatically tracking the object through control that is executed by at least any one of the first control and the second control, wherein, in the first control, whether to execute the image capturing direction control by the first control is determined based on a shift amount of the angle of view determined based on a moving amount of the object, wherein, in the first control, in a case where the shift amount is more than or equal to a predetermined threshold, the image capturing direction control by the first control is determined to be executed, and in a case where the shift amount is less than the predetermined threshold, the image capturing direction control by the first control is determined not to be executed, wherein the predetermined threshold is a maximum shift amount of the second control.

* * * * *